United States Patent [19]
Miyake

[11] Patent Number: 5,767,904
[45] Date of Patent: Jun. 16, 1998

[54] ELECTRONIC STILL CAMERA AND METHOD OF CONTROLLING SHUTTER

[75] Inventor: Izumi Miyake, Asaka, Japan

[73] Assignee: Fuji Photo Film Co. Ltd., Kanagawa, Japan

[21] Appl. No.: 470,275

[22] Filed: Jun. 6, 1995

[30] Foreign Application Priority Data

Jun. 16, 1994 [JP] Japan .................. 6-156430

[51] Int. Cl.$^6$ .................................................. H04N 5/235
[52] U.S. Cl. ......................................... 348/362; 348/312
[58] Field of Search .............................. 348/207, 221, 348/362, 363, 367, 368, 222, 312; 354/227.1, 233, 456, 435, 437, 412, 267.1; 396/263, 452, 475; H04N 5/225, 5/235

[56] References Cited

U.S. PATENT DOCUMENTS 4,972,267  11/1990  Kaneko et al. ................. 348/367
5,168,364  12/1992  Kondo et al. .................. 348/368
5,216,511   6/1993  Tani ................................ 348/234
5,517,243   5/1996  Kudo et al. .................... 348/296

*Primary Examiner*—Andrew Faile
*Assistant Examiner*—Tuan V. Ho

[57] ABSTRACT

In an electronic still camera, a mechanical shutter is opened in synchronizing with a synchronizing signal generated by a synchronizing signal generating circuit, a solid state electronic imaging device is exposed while the mechanical shutter is being opened, and a video signal outputted from the imaging device and representing an imaged subject is processed by a signal processing circuit. The synchronizing signal generating circuit starts the generation of the synchronizing signal in response to a shutter release by a shutter release button. The mechanical shutter is opened in synchronizing with a synchronizing signal which is generated after a predetermined constant time period elapses from the start of the operation of the synchronizing signal generating circuit, and is closed after time necessary for exposure elapses from the opening of the mechanical shutter.

16 Claims, 11 Drawing Sheets

Fig. 2

CONTENTS OF INTERNAL ROM
OF COMPRESSION CPU

| |
|---|
| REFERENCE CODE A |
| DATA SET TIME $\alpha$ |
| EXPOSURE PREPARATION TIME $\beta$ |
| NUMBER OF BYTES T OF COMPRESSED IMAGE DATA FOR ONE FRAME |
| NUMBER OF BYTES S OF ONE BLOCK |
| PROGRAM FOR CALCULATING NUMBER OF CONTINUOUSLY SHOOTABLE FRAMES |
| PROGRAM FOR CALCULATING NUMBER OF REMAINING FRAMES |
| PROGRAM FOR SINGLE PICTURE-TAKING MODE |
| PROGRAM FOR CONTINUOUS PICTURE-TAKING MODE |

CONTENTS OF INTERNAL ROM OF DISPLAY CPU

CONTENTS OF INTERNAL RAM OF DISPLAY CPU

Fig.6

CONTENTS OF DATA IN EEPROM

| GAIN DATA OF GAMMA CORRECTION CIRCUIT |
|---|
| GAIN DATA OF REPRODUCTION CIRCUIT |
| REFERENCE VOLTAGE OF A/D CONVERTER |

1

ELECTRONIC STILL CAMERA AND METHOD OF CONTROLLING SHUTTER

BACKGROUND OF THE INVENTION

1. Field of the Invention

The present invention relates to an electronic still camera and a method of controlling the operation of the electronic still camera.

2. Description of the Prior Art

In an electronic still camera having a mechanical shutter, in general, the mechanical shutter is opened in synchronizing with a vertical synchronizing reference signal (referred to as a VD signal hereinafter) generated by a clock signal generating circuit included in the electronic still camera. The mechanical shutter is closed after an elapse of the time necessary for an exposure. A solid state electronic imaging device (e.g. a CCD=Charge-Coupled-Device) is exposed during the time from the opening of the mechanical shutter to the closing of the mechanical shutter. Image charges accumulated in the CCD by the exposure are read out in synchronizing with the VD signal to be processed.

FIGS. 12a and 12b are time charts showing an operation of a conventional electronic still camera having a mechanical shutter. In the conventional electronic still camera having the mechanical shutter, when a shutter release button is half-depressed, a clock signal generating circuit is caused to start the generation of the VD signal. Thereafter, when a shutter release is made by (full-depression of) the shutter release button, unnecessary charges in the CCD is swept out in synchronizing with a VD signal G which is generated after a predetermined time m·VD (m is an integer, e.g. m=3 in this case) has elapsed from a VD signal D which is generated immediately after the full-depression of the shutter release button. Thereafter, the mechanical shutter is opened in synchronizing with a VD signal H. The mechanical shutter is closed after an elapse of a time necessary for an exposure from the opening thereof. The CCD is exposed from the opening to the closing of the mechanical shutter. Image charges accumulated in the CCD by the exposure is read out in synchronizing with a VD signal I to be processed.

Since the operation of the shutter release by (full-depression of) the shutter release button is performed by an user, the timing thereof is hardly synchronized with the VD signal. For example, there are a case where the full-depression of the shutter release button is made immediately after a VD signal C as shown in FIG. 12a, and a case where the full-depression is made immediately before the VD signal D.

In these two cases, while timing of the full-depression is different, the sweep of unnecessary charges, opening of the mechanical shutter and read out of the image charges are executed in synchronizing with the same VD signals.

Accordingly, in the conventional electronic still camera, the time from the full-depression until the opening of the mechanical shutter is not constant, but fluctuates such that the time is τ1 (≈5 VD) in FIG. 12a, whereas the time is τ2 (≈4 VD) in FIG. 12b. There is a difference of 1 VD (=1/60 seconds) at longest between a minimum value and a maximum value of the time from the full-depression by the user to the opening of the mechanical shutter.

A skilled cameraman grasps a very slight time from the full-depression until the opening of the mechanical shutter and operates the shutter button to full-depress in anticipation of this very slight time. However since there is the time difference of about 1 VD in the time from the full-depression to the shutter opening, the skilled cameraman sometimes misses a shutter chance due to the slight time difference, especially in imaging of a subject moving at a very high speed.

On the other hand, in the conventional electronic still camera having the mechanical shutter, the mechanical shutter is rolled or wound up irrespective of progress of processings of image data obtained by imaging. Accordingly, there is a case where the mechanical shutter is rolled up while the image data is being processed.

The mechanical shutter is generally rolled up by a motor which is supplied with a large current when rolling of the shutter is done. Thus, the processing system of the image data may not correctly operate such that the current fed to the image data processing system fluctuates, a large voltage drop occurs and the like, when the shutter is rolled up during the image data processing. Noises may be generated to the image data processing system.

Accordingly, the conventional electronic still camera encounters such problems that image data processing are not correctly performed, the processed image data includes errors and so on.

SUMMARY OF THE INVENTION

An object of the present invention is to provide an electronic still camera and a method of controlling the operation thereof in which a mechanical shutter is always opened after a predetermined constant time elapses from a shutter release by a shutter release button to image a subject.

Another object of the present invention is to correctly process image data by preventing a mechanical shutter from being rolled up while the image data is being processed.

According to the first aspect of the present invention, an electronic still camera in which a mechanical shutter is opened in synchronizing with a synchronizing signal generated by a synchronizing signal generating circuit and a solid state electronic imaging device is exposed while the mechanical shutter is being opened, comprises: starting means for causing the synchronizing signal generating circuit to start the generation of the synchronizing signal in response to a shutter release by a shutter release button; shutter control means for causing the mechanical shutter to open in synchronizing with a synchronizing signal which is generated after a first predetermined constant time period elapses from the start of the operation of the synchronizing signal generating circuit, and for causing the mechanical shutter to close after time necessary for exposure elapses from the opening of the mechanical shutter; and signal processing means for processing a video signal representing an imaged subject and outputted from the solid state electronic imaging device which is exposed during the time from the opening of the mechanical shutter to the closing of the mechanical shutter.

In an electronic still camera in which a mechanical shutter is opened in synchronizing with a synchronizing signal generated by a synchronizing signal generating circuit and a solid state electronic imaging device is exposed while the mechanical shutter is being opened, a method of controlling the operation of the electronic still camera comprises the steps of: causing the synchronizing signal generating circuit to start the generation of the synchronizing signal in response to a shutter release by a shutter release button; causing the mechanical shutter to open in synchronizing with a synchronizing signal which is generated after a first predetermined constant time period elapses from the start of the operation of the synchronizing signal generating circuit, causing the mechanical shutter to close after time necessary for exposure elapses from the opening of the mechanical shutter; and processing a video signal representing an imaged subject and outputted from the solid state electronic imaging device which is exposed during the time from the opening of the mechanical shutter to the closing of the mechanical shutter.

According the the first aspect of the present invention, the generation of synchronizing signal is started in response to the shutter release by the shutter release button. The synchronizing signal includes a vertical synchronizing reference signal and so on. The mechanical shutter is opened when the first predetermined constant time has elapsed from the generation of the synchronous signal, and is closed when the time required for the exposure has elapsed. The time necessary for the exposure may be an exposure time (shutter opining time) obtained by, for example, an automatic exposure (AE) processing, or a time set in an exposure amount setting device or the like provided for the electronic still camera.

The solid state electronic imaging device is exposed from the opening until the closing of the mechanical shutter. Since the exposure of the solid state electronic imaging device is executed in synchronizing with the synchronizing signal, the first predetermined constant time is preferably integral multiple of a period of the synchronizing signal.

The video signal representing the imaged subject and outputted from the exposed solid state electronic imaging device is processed to be digital image data, which is stored an external storage device such as a memory card as required.

According to the first aspect of the present invention, the synchronizing signal generating circuit is caused to start the generation of the synchronizing signal in response to the shutter release by a user who depresses the shutter release button. The mechanical shutter is opened in synchronizing with a synchronizing signal generated when the first predetermined constant time has elapsed from the start of the synchronizing signal generating circuit to image a subject. Accordingly, it is always possible to open the mechanical shutter after an elapse of the constant time from the shutter release to image the subject. Thus, the user can take the picture of a desired subject without missing a shutter chance by grasping the constant time.

In an embodiment of the present invention, the synchronizing signal is generated after an elapse of the second predetermined constant time from the shutter release. It is required sometimes that data necessary for signal processing (for example, gain data and the like for white balance adjustment) is set after the shutter release. The second constant time is required to set above data. In this embodiment, accordingly, the data necessary for signal processing can be set during the second constant time.

Further in this embodiment, the mechanical shutter can be always opened when the time obtained by adding the second constant time to the first constant time has elapsed after the shutter release to image the subject. Accordingly, the user can take the picture of a desired subject without missing a shutter chance by grasping the sum of the first and second constant time.

According to the second aspect of the present invention, an electronic still camera imaging a subject by opening and closing a mechanical shutter to expose a solid state electronic imaging device, comprises: shutter control means for causing the mechanical shutter to open in response to a shutter release by a shutter release button and to close after time necessary for exposure elapses from the opening of the mechanical shutter; signal processing means for converting a video signal representing an imaged subject and outputted from the solid state electronic imaging device which is exposed during the time from the opening of the mechanical shutter to the closing of the mechanical shutter to digital image data; and control means for causing a shutter winding device to roll up the mechanical shutter after the processing in the signal processing means has been completed.

In an electronic still camera for imaging a subject by opening and closing a mechanical shutter to expose a solid state electronic imaging device, a method of controlling the operation of the electronic still camera comprises the steps of: causing the mechanical shutter to open in response to a shutter release by a shutter release button; causing the mechanical shutter to close after time necessary for exposure elapses from the opening of the mechanical shutter; converting a video signal representing an imaged subject and outputted from the solid state electronic imaging device which is exposed during the time from the opening of the mechanical shutter to the closing of the mechanical shutter to digital image data; and rolling up the mechanical shutter after the conversion processing to the digital image data has been completed.

According to the second aspect of the present invention, the operation of rolling the mechanical shutter up is executed after the processing for converting the video signal outputted from the solid state electronic imaging device to the digital image data has been completed. Accordingly, it can be prevented that the operation of rolling the mechanical shutter up is done while the video signal is being processed. Thus, such harmful influence affected to data processing can be avoided that data processing is not correctly processed by current fluctuation, noises and so on due to the rolling of the mechanical shutter and data includes errors.

In an embodiment of the second aspect of the present invention, the processing for compressing digital image data is performed after completion of rolling the mechanical shutter. The mechanical shutter is rolled up, in this embodiment, after the processing (A/D conversion) of the video signal from the solid state electronic imaging device, but before the start of the compression processing. The operation of rolling the mechanical shutter can be prevented from being performed during the processings of the video signal and image data. In this embodiment, it can be avoided that data processing is affected such that data processing is not correctly performed by current fluctuation, noises and so on due to the rolling of the mechanical shutter, and data includes errors.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows the contents of an internal ROM of a compression CPU.

FIG. 6 shows the contents of an EEPROM.

DESCRIPTION OF THE PREFERRED EMBODIMENTS

Figure 1:
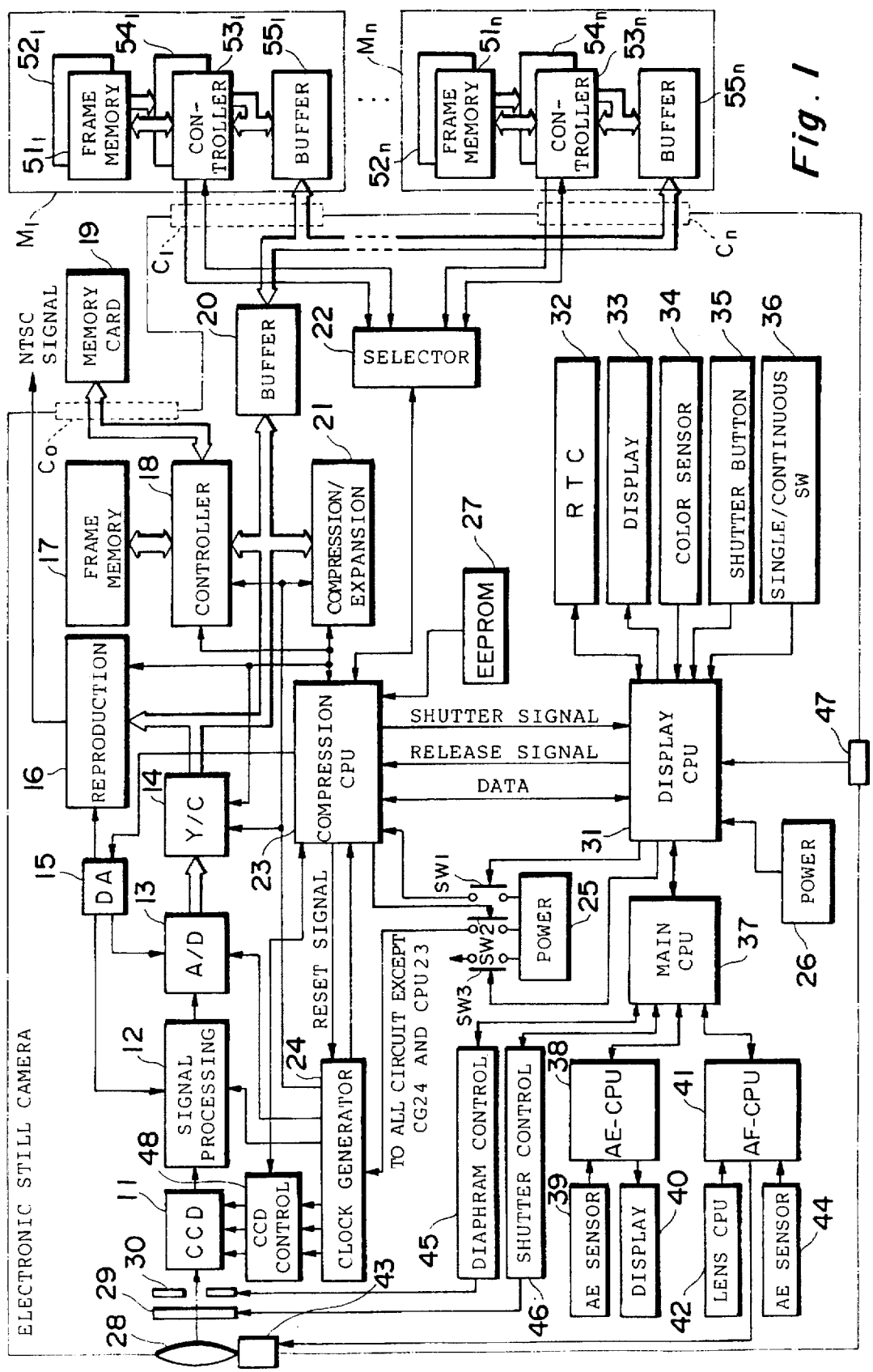
FIG. 1 is a block diagram showing the electrical construction of an electronic still camera.

FIG. 1 is a block diagram showing the electrical construction of an electronic still camera. A memory card 19 (an external storage medium) for storing image data representing an image of a subject imaged in the single picture-taking mode or the continuous picture-taking mode and add-on (extended) memory boards M1 to Mn (auxiliary memories mounted as options) for temporarily storing image data representing images of subjects for a plurality of frames imaged in the continuous picture-taking mode are connected to the electronic still camera.

The memory card 19 contains a semiconductor memory, and is freely loadable/unloadable to a connector CO provided for the electronic still camera. The memory card 19 is electrically connected to various types of buses of the electronic still camera (through a memory controller 18) by being loaded to the connector CO. Compressed image data for one frame is stored as one file in the memory card 19. The number of bytes (the length) of the compressed image data in each file is fixed to a predetermined value (the number of bytes T). The memory card 19 is provided with a directory and an FAT (File Allocation Table) for managing files. In addition, the memory card 19 is provided with an area (a date data area) for storing date data representing the date of the time when the image data in each file is obtained by imaging in correspondence with the file. The memory card 19 will be generally loaded or unloaded by a user of the electronic still camera.

The add-on memory boards M1 to Mn are removably mounted on connectors C1 to Cn provided for the electronic still camera, respectively. The memory boards M1 to Mn are electrically connected to various types of buses of the electronic still camera by being respectively mounted on the connectors C1 to Cn. Numbers 1 to n are respectively assigned to the connectors C1 to Cn in that order. Memory boards can be mounted on all of the n connectors. An arbitrary number of (not more than n) memory boards can be also mounted on some of the connectors. If the memory boards are connected to some of the connectors, it is promised that the memory boards are mounted in ascending order of numbers beginning with the connector $C_1$ assigned a number 1.

The memory boards M1 to Mn are generally provided inside the housing of the electronic still camera. The memory boards M1 to Mn will be mainly mounted by a manufacturer of the electronic still camera. It goes without saying that the user can mount the memory boards M1 to Mn.

The memory board M1 comprises two frame memories $51_1$ and $52_1$ (a SRAM, a DRAM, a flash memory or the like), memory controllers $53_1$ and $54_1$ corresponding to the frame memories, and a buffer memory $55_1$.

Each of the frame memories has a sufficient storage capacity to store image data for one frame obtained by imaging. Consequently, image data for two frames obtained by imaging can be stored in the memory board M1.

The buffer memory $55_1$ is used for temporarily storing image data to be written to the frame memory $51_1$ or $51_2$ or read out from the frame memory. The memory controller $53_1$ controls writing of the image data to the frame memory $51_1$ and reading of the image data from the frame memory $51_1$. The memory controller $54_1$ controls writing of the image data to the frame memory $52_1$ and reading of the image data from the frame memory $52_1$.

The memory controllers $53_1$ and $54_1$ respectively contain status registers. A predetermined particular code (which is taken as A) is set in the status registers. This code A is used when a compression CPU 23 confirms whether or not the memory board M1 is mounted on the connector C1.

The construction of the other memory board Mi (i=2 to n) is the same as the construction of the memory board M1. When i memory boards are connected, it is possible to store image data for 2i frames as a whole.

In order to write image data to the frame memories $51_i$ and $52_i$ in the memory board Mi (i=1 to n) or read out the image data from the frame memories, either one of the frame memories is selected. The selection is made by the compression CPU 23 selecting the corresponding memory controller (either one of $53_i$ and $54_i$) through a selector 22.

The operation of th e electronic still camera is mainly controlled by the compression CPU 23, a display CPU 31 and a main CPU 37. The CPUs 23, 31 and 37 perform processing such as imaging and recording in the single picture-taking mode and the continuous picture-taking mode as described later while communicating with one another.

The compression CPU 23 carries out control of processing of image data obtained by imaging, control of writing and reading of image data to and from the frame memories 17, $51_i$ and $52_i$, and control of writing and reading of processed image data (compressed image data) to and from the memory card 19. The display CPU 31 carries out control of acceptance and display of signals from various types of operation buttons and sensors and particularly, control of start, termination and the like of imaging processing on the bas is of the operation of the shutter release button 35 by the user. The main CPU 37 carries out automatic focusing (AF) control and automatic exposure (AE) control.

Programs and data required for the imaging processing executed by the compression CPU 23 are previously stored in an internal ROM of the compression CPU 23. FIG. 2 shows data and programs previously stored in the internal ROM of the compression CPU 23.

A program for calculating the number of continuously shootable frames is a program for finding the number of frames L which can be continuously taken in the continuous picture-taking mode (hereinafter referred to as "the number of continuously shootable frames").

When the shutter release button 35 is half-depressed, the compression CPU 23 finds the number of continuously shootable frames L in the following manner in accordance with the program for calculating the number of continuously shootable frames.

First, the compression CPU 23 sequentially accesses the memory boards M1 to Mn through the selector 22 and the connectors C1 to Cn, to read out the code A in the status registers provided in the memory controllers $53_i$ and $54_i$ in the memory board Mi. The compression CPU 23 compares the code A read out from the status register in the memory controllers $53_i$ or $54_i$ with a reference code A stored in the internal ROM. If the codes coincide with each other, the compression CPU 23 judges that the memory board Mi accessed is connected. If the codes do not coincide with each other (in many cases, the code A is not read out from the memory controller in the memory board because the memory board accessed is not connected), the compression CPU 23 judges that memory board accessed is not connected. The compression CPU 23 repeatedly performs the foregoing processing sequentially from the memory board M1 to the memory board Mn, to count the number of memory boards connected (k is taken as the count value). When it is first judged that no memory board is connected, the counting is stopped. In such a manner, the number of memory boards k connected is found.

Subsequently, the compression CPU 23 finds the number of continuously shootable frames L on the basis of the count value k. In the continuous picture-taking mode, image data for the first frame is stored in the frame memory 17. Image data for the second frame and the subsequent frames are sequentially stored in respective frame memories in the memory boards M1 to Mk. Consequently, the number of continuously shootable frames L in a case where k memory boards are connected is L=2·K+1. The number of continuously shootable frames L is applied to the display CPU 31.

A program for calculating the number of remaining frames is a program for calculating the number of frames N corresponding to image data which can be stored in the memory card 19 (hereinafter referred to as "the number of remaining frames").

The compression CPU 23 calculates the number of remaining frames N in accordance with the program for calculating the number of remaining frames when the shutter release button 35 is half-depressed. First, the compression CPU 23 issues to the memory controller 18 a command to read out the FAT in the memory card 19. The memory controller 18 reads out the FAT from the memory card 19 on the basis of this command.

When the memory card 19 is loaded, the memory controller 18 applies to the compression CPU 23 the FAT read out from the memory card 19. The compression CPU 23 finds the vacant capacity of the memory card 19 on the basis of the FAT read out. In addition, the compression CPU 23 refers to the number of bytes T constituting compressed image data for one frame which is previously stored in the internal ROM. The compression CPU 23 finds the number of remaining frames N on the basis of the number of bytes T corresponding to one frame and the found vacant capacity. The compression CPU 23 feeds to the display CPU 31 the found number of remaining frames N and data indicating that the memory card 19 is loaded (loading detection data).

If the memory card 19 is not loaded, the memory controller 18 applies to the compression CPU 23 data indicating that no memory card is loaded (unloading detection data). The compression CPU 23 applies, if it receives the unloading detection data from the memory controller 18, the unloading detection data to the display CPU 31.

Data set time α stored in the internal ROM of the compression CPU 23 represents time to be measured by an internal timer of the compression CPU 23 after the shutter is released by depressing the shutter release button 35 (full-depression of the button 35).

The display CPU 31 sends to the compression CPU 23 data required for imaging processing such as white balance data during the data set time α. In addition, the compression CPU 23 sets gain data required for image signal processing in a signal processing circuit 12 and the like after the gain data has been converted into an analog signal by a digital-to analog (D/A) conversion circuit 15 (an electronic volume).

Exposure preparation time β represents time interval until a focal-plane shutter 29 is opend after the data set time α has elapsed. In this embodiment, the time β is set to 4 VD (1 VD=1/60 seconds). The compression CPU 23 sets imaging-allowed time γ which will be explained later in a CCD control circuit 48 and the CCD control circuit 48 sweeps unnecessary charges accumulated in a CCD (Charge-Coupled Device)11 during the exposure preparation time β.

Interval time δ represents interval time between imaging for a preceding frame and imaging for the succeeding frame in the continuous picture-taking mode. The interval time δ is determined in accordance with the number of frames continuously taken for one second. For example, if three frames are continuously taken for one second, δ is set to 7 VD (1 VD=1/60 seconds).

The number of bytes S constituting one block is used when image data obtained by imaging is compressed. Image data for one frame is divided into a plurality of blocks, and is compressed for each block in accordance with an ADCT (Adaptive Discrete Cosine Transform) algorithm. The compressed data in each of blocks is converted into a Huffman code. Thereafter, the block is adjusted to the length of the number of bytes S (length-fixing processing). If the number of bytes constituting the block converted into the Huffman code (coded block) is less than S, dummy data is added to the block so that the number of bytes becomes S. If the number of bytes constituting the coded block exceeds S, compression processing and Huffman coding processing are repeated until the number of bytes becomes S. The product of the number of bytes S and the number of blocks obtained by the division becomes the number of bytes T constituting the image data for one frame.

A program for the single picture-taking mode is an imaging processing program for a compression CPU executed in the single picture-taking mode. A program for the continuous picture-taking mode is an imaging processing program for a compression CPU executed in the continuous picture-taking mode. The contents of the two programs will be described in detail in the operations of the electronic still camera in the single picture-taking mode and the continuous picture-taking mode.

Figure 3:
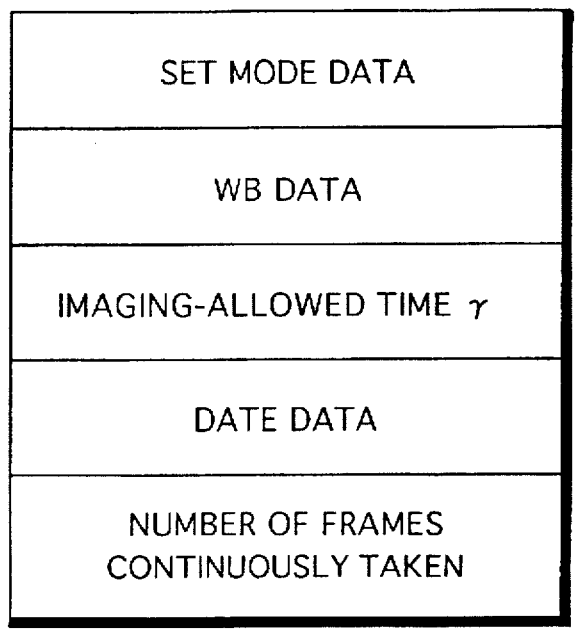
FIG. 3 shows the contents of an internal RAM of the compression CPU.

Data used in the imaging processing are stored in the internal RAM of the compression CPU 23. FIG. 3 shows data stored in the internal RAM of the compression CPU 23.

Set mode data is data representing the state of a continuous picture-taking/single picture-taking selecting switch 36. When the continuous picture-taking/single picture-taking selecting switch 36 is set to the single picture-taking mode, the set mode data is data representing the single picture-taking mode. If the continuous picture-taking/single picture-taking selecting switch 36 is set in the continuous picture-taking mode, the set mode data becomes data representing the continuous picture-taking mode. The display CPU 31 reads the state of the continuous picture-taking/single picture-taking selecting switch 36 when the shutter release button 35 is half-depressed, to apply the state of the switch 36 to the compression CPU 23 as the set mode data. The compression CPU 23 selects either one of the program for the single picture-taking mode and the program for the continuous picture-taking mode in accordance with the the set mode data, to perform imaging processing.

White balance data (WB data) is gain data set in a white balance adjustment circuit included in the signal processing circuit 12. The display CPU 31 finds the value of the WB data on the basis of a color detection signal of a color sensor 34. The WB data is fed to the compression CPU 23 from the display CPU 31 during the data set time α clocked since the shutter was released.

Imaging-allowed time (zone) γ represents the time (zone) when imaging by CCD 11 is allowed. The imaging-allowed time γ is determined on the basis of a shutter speed (the time while a focal-plane shutter 29 is being opened) found by the main CPU 37 at the time of automatic exposure (AE) processing. The imaging-allowed time γ is time which is integral multiple of VD (n·VD:n is an integer) determined by counting fractions less than 1 VD (1/60 seconds) of the shutter speed as a whole number. For example, when the time representing the shutter speed is 0.3 VD or 0.5 VD, the imaging allowed time γ becomes 1 VD. The shutter 29 is opened and closed within the imaging-allowed time γ. The shutter speed (shutter speed data) is fed from the main CPU 37 to the display CPU 31, and is stored in the internal RAM of the display CPU 31. The shutter speed data is given to the compression CPU 23 from the display CPU 31 during the data set time a clocked since the shutter was released. The compression CPU 23 finds the imaging-allowed time γ on the basis of the shutter speed data and stores the time in the internal RAM.

Date data is data representing the present date measured by a real time clock (hereinafter referred to as "RTC") 32. The display CPU 31 reads out the present date from the RTC 32 during the time a clocked since the shutter was released and applies the date to the compression CPU 23 as date data. When the compressed image data is stored as a file in the memory card 19, the date data is stored in correspondence with the file in the date data area of the memory card 19.

The number of frames continuously taken represents the number of frames taken in the continuous picture-taking mode. Every time imaging is performed for each frame, the compression CPU 23 increments the number of frames continuously taken by one beginning with 1. The number of frames continuously taken is used when the image data obtained by the imaging is compressed.

Figure 4:
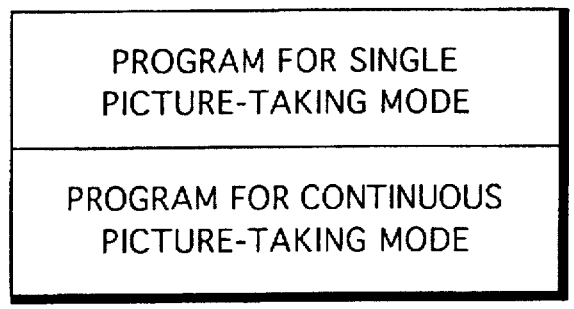
FIG. 4 shows the contents of an internal ROM of a display CPU.

A program required for the imaging processing is previously stored, as shown in FIG. 4, in an internal ROM of the display CPU 31. The program for the single picture-taking mode is an imaging processing program for a display CPU 31 executed in the single picture-taking mode. The program for the continuous picture-taking mode is an imaging processing program for a display CPU 31 executed in the continuous picture-taking mode. The contents of the two programs will be respectively described in detail in the operations of the electronic still camera in the single picture-taking mode and the continuous picture-taking mode.

Figure 5:
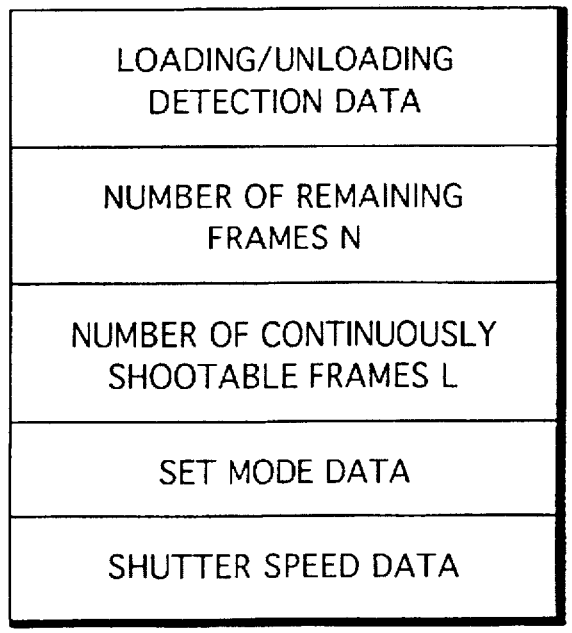
FIG. 5 shows the contents of an internal RAM of the display CPU.

Data used in the imaging processing are stored in the internal RAM of the display CPU 31. FIG. 5 shows data stored in the internal RAM of the display CPU 31.

Loading/unloading detection data is data indicating whether or not the memory card 19 is loaded. The data is sent to the display CPU 31 from the compression CPU 23 when the shutter release button 35 is half-depressed as described above.

The number of remaining frames N and the number of continuously shootable frames L are those fed to the display CPU 31 from the compression CPU 23, as described above. The set mode data is data representing the state of the continuous picture-taking/single picture-taking selecting switch 36, as described above. The shutter speed data is data representing the time while the shutter 29 is being opened, which is given to the display CPU 31 from the main CPU 37.

Gain data of a gamma correction circuit included in the signal processing circuit 12, gain data of a reproduction circuit 16 and data representing a reference voltage of an analog-to-digital (A/D) conversion circuit 13 as shown in FIG. 6 are previously stored in an EEPROM (Electrically Erasable Programmable ROM) 27. The data are read out by the compression CPU 23, are converted into analog data by the D/A conversion circuit 15 and then, are respectively applied to the signal processing circuit 12, the reproduction circuit 16 and the A/D conversion circuit 13 during the time α clocked since the shutter was released.

Figure 7:
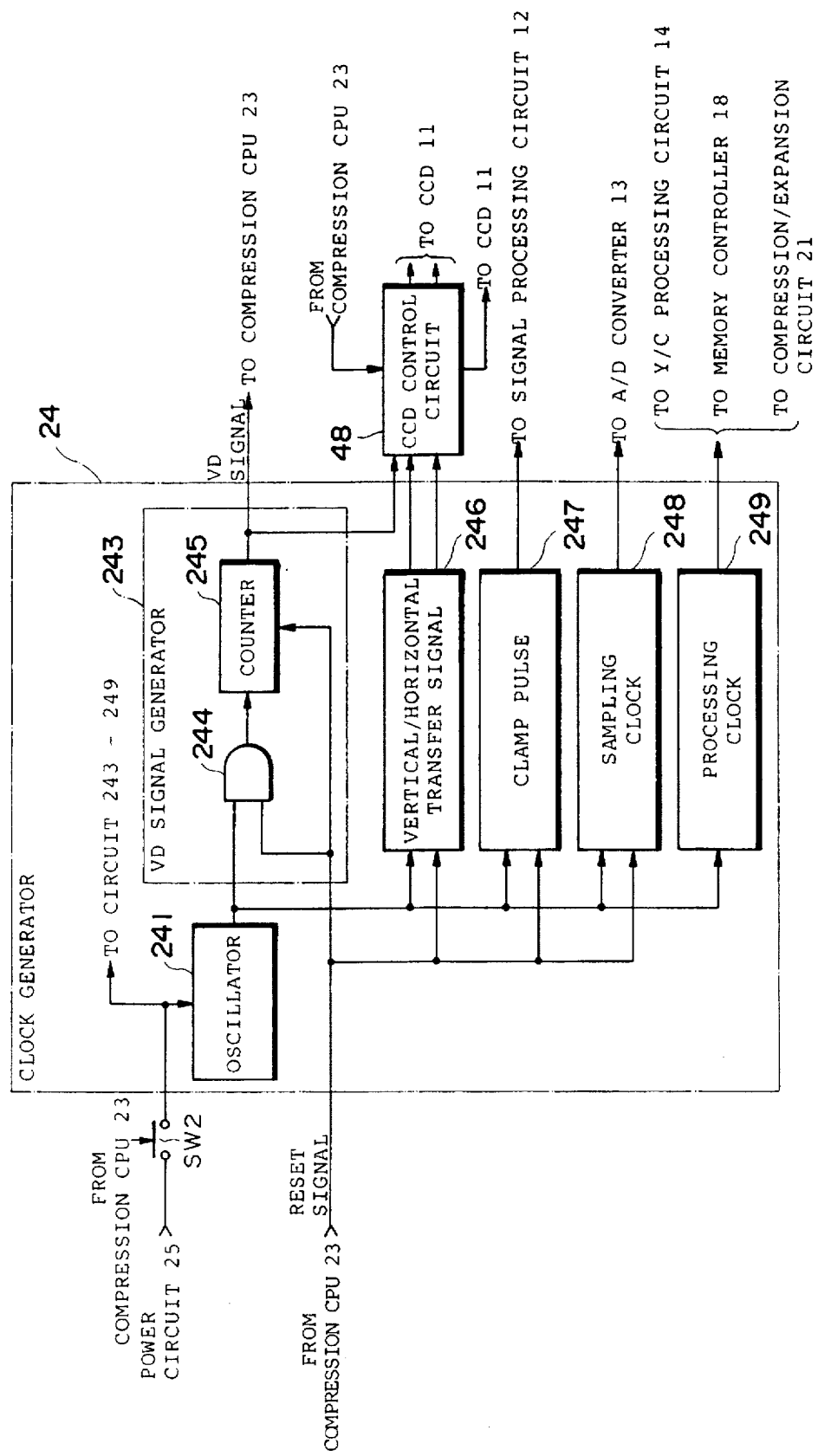
FIG. 7 is a block diagram showing the electrical construction of a clock generator.

A Clock generator (hereinafter referred to as "CG") 24 supplies the CCD control circuit 48 (the CCD 11), the signal processing circuit 12, the A/D converter 13, a Y/C processing circuit 14, the memory controller 18 and a compression/expansion circuit 21 with clock signals necessary therefor. FIG. 7 is a block diagram showing a detailed electrical construction of the CG 24.

A power switch SW2 is turned on by the compression CPU 23 when the shutter is released by depressing the shutter release button 35 (full-depression). Electric power is supplied to an oscillator 241, a VD signal generating circuit 243, a vertical/horizontal transfer signal generating circuit 246, a clamp pulse signal generating circuit 247, a sampling clock signal generating circuit 248 and a processing clock signal generating circuit 249 constituting the CG 24 from a power circuit 25.

The oscillator 241 starts oscillation to output oscillated clock signals when the power is supplied. The clock signals are fed to the VD signal generating circuit 243 (an AND gate 244), the vertical/horizontal transfer signal generating circuit 246, the clamp pulse signal generating circuit 247, the sampling clock signal generating circuit 248 and the processing clock signal generating circuit 249.

The oscillated clock signals from the oscillator 241 are fed to a counter 245 included in the VD signal generating circuit 243 through the AND gate 244. The counter 245 outputs a clock signal for each and every time when the counter counts a predetermined number of the oscillated clock signals to create a VD signal having a period of 1/60 seconds by frequency-dividing the oscillated clock signals fed.

A reset signal inputs the AND gate 244 and the counter 245 both included in the VD signal generating circuit 243 from the compression CPU 23.

The reset signal is kept at the low level (L level) until the data set time a elapses from when the oscillator 241 starts the output of the oscillated clock signals (the shutter is released). The output of the AND gate 244 is maintained at the L level while the reset signal is at the L level, so that the oscillated clock signals from the oscillator 241 are not fed to the counter 245. Therefor the counter 245 does not output the VD signal.

The compression CPU 23 changes the level of the reset signal to the high level (H level) after the data set time a has elapsed. As a result, the oscillated clock signals from the oscillator 241 are fed to the counter 245 through the AND gate 244. The count value of the counter 245 is reset to zero by the leading edge of the reset signal in which the level of the reset signal changes from the L level to the H level. Accordingly, the counter 245 starts to generate the VD signal having a period of 1/60 seconds which starts at the time point when the reset signal changes from the L level to the H level (when the time α has elapsed after the shutter was released).

The VD signals generated by the counter 245 are fed to the compression CPU 23 and the CCD control circuit 48.

which clock after the data set time α has elapsed by counting the VD signals fed by the counter 245.

The compression CPU 23 set the imaging-allowed time γ to the CCD control circuit 48 during the exposure preparation time β beginning from the time point when the data set time has elapsed.

The CCD control circuit 48 sweeps unnecessary charges in the CCD 11 after a time of 3 VD has elapsed after an elapse of the data set time α. The CCD control circuit 48 measures the imaging-allowed time γ from the time point when a time of 4 VD (time β) has elapsed after an elapse of the data set time α, and supplies the CCD 11 with transfer signals for accumulated image charges after the imaging-allowed time γ has elapsed. As a result, the image charges are read out of the CCD 11.

The reset signal from the compression CPU 23 is also fed to the vertical/horizontal transfer signal generating circuit 246, clamp pulse signal generating circuit 247 and sampling clock signal generating circuit 248. When the reset signal attains the H level, the vertical/horizontal transfer signal generating circuit 246 frequency-divides the oscillated clock signals fed thereto to create a vertical transfer signal and a horizontal transfer signal and feeds these transfer signals to the CCD control circuit 48. The CCD control circuit 48 feeds the vertical and horizontal transfer signals to the CCD 11 when sweeping of the unnecessary charges and transfer of the image charges in the CCD 11 are to be executed. When the reset signal attains the H level, the clamp pulse signal generating circuit 247 frequency-divides the oscillated clock signals fed thereto to create a clamp pulse signal and feeds the created clamp pulse signal to the signal processing circuit 12. When the reset signal attains the H level, the sampling clock signal generating circuit 248 frequency-divides the oscillated clock signals fed thereto to create a sampling clock signal and feeds the created sampling clock signal to the A/D conversion circuit 13.

The reset signal from the compression CPU 23 is not fed to the processing clock signal generating circuit 249. The processing clock signal generating circuit 249 frequency-divides the oscillated clock signals, which are fed from the oscillator 241, to create a processing clock signal and feeds the created processing clock signal to the Y/C processing circuit 14, memory controller 18 and compression/expansion circuit 21. A common clock signal line is connected to these circuit 14, 18 and 21 from the processing clock signal generating circuit 249.

[Operation of electronic still camera in single picture-taking mode]

When the electronic still camera is used, the user turns a power supply switch 47 provided for the electronic still camera on. Consequently an ON signal is applied to the display CPU 31 from the power supply switch 47. Even when the power supply switch 47 of the electronic still camera is in the off state, power is supplied to the display CPU 31 by an auxiliary power supply circuit 26 (a battery or the like), so that the display CPU 31 is in the sleep state. The display CPU 31 is raised from the sleep state in response to the ON signal from the power supply switch 47, to start the operation. First, the display CPU 31 turns a power supply switch SW3 on. Consequently, power is supplied from a main power supply circuit 25 to all circuits other than the CG 24 and the compression CPU 23.

The user of the electronic still camera previously selects either one of the continuous picture-taking mode and the single picture-taking mode by the continuous picture-taking/single picture-taking selecting switch 36 when imaging is performed. If the single picture-taking mode is selected, processing shown in a timing chart of FIG. 8 is performed.

If the shutter release button 35 is half-depressed by the user, a half-depression signal is applied to the display CPU 31 from the shutter release button 35. Consequently, the display CPU 31 reads the state of the continuous picture-taking/single picture-taking selecting switch 36 (the set mode data) and stores the set mode data in the internal RAM. When the switch 36 is set in the single picture-taking mode, the display CPU 31 selects the program for the single picture-taking mode previously stored in the internal ROM. If the switch 36 is set in the continuous picture-taking mode, the display CPU 31 selects the program for the continuous picture-taking mode which is previously stored in the internal ROM. In this case, the switch 36 is set in the single picture-taking mode. Accordingly, the display CPU 31 selects the program for the single picture-taking mode. The display CPU 31 performs processing in the single picture-taking mode in accordance with this processing program.

The display CPU 31 first turns a switch SW1 of the power supply circuit 25 on. Consequently, power is supplied to the compression CPU 23, so that the compression CPU 23 is started (time $t_1$).

Figure 8:
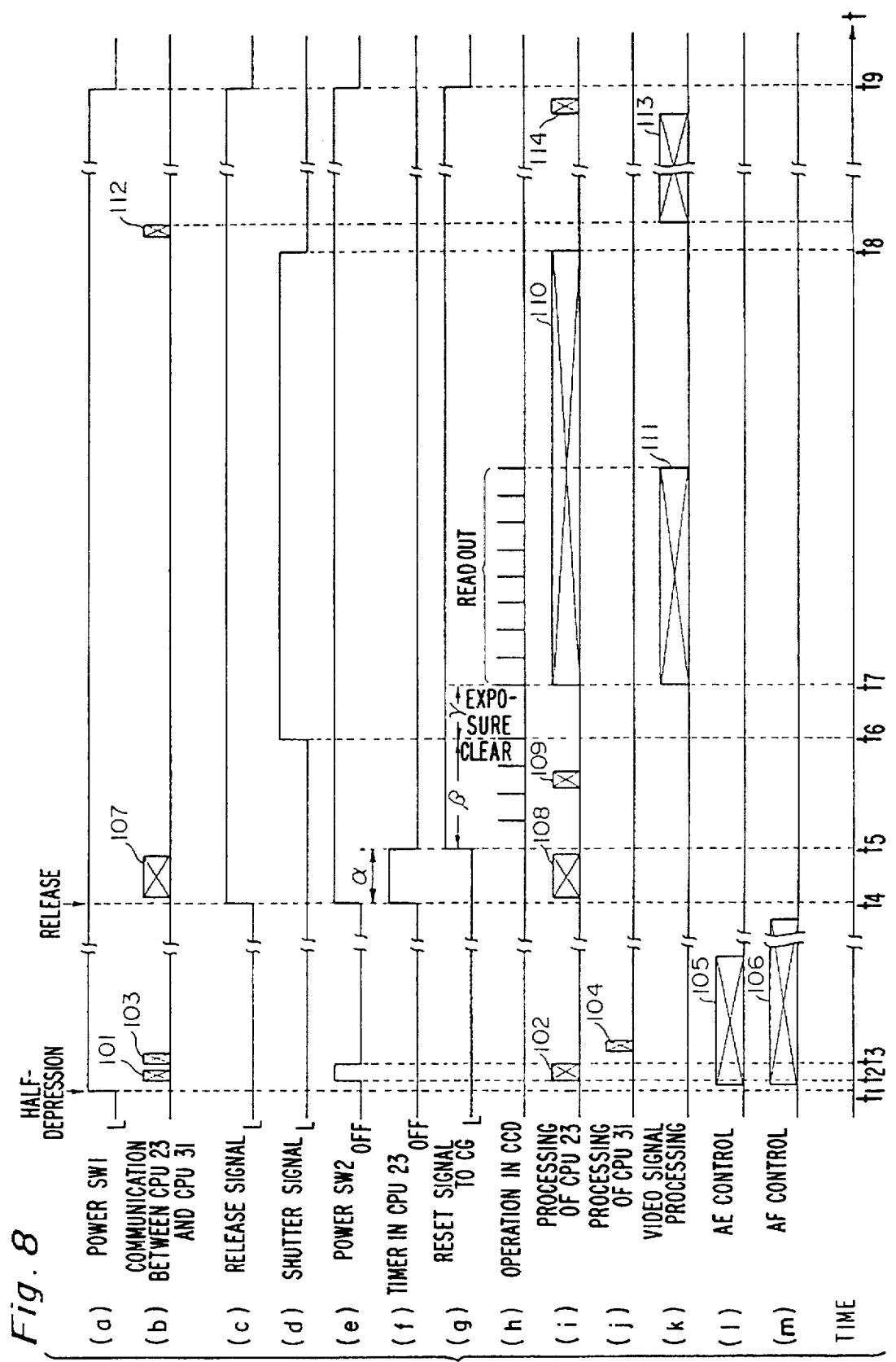
FIG. 8 is a timing chart showing processing performed by the electronic still camera in the single picture-taking mode.

Furthermore, the display CPU 31 feeds the set mode data (in this case, this data represents the single picture-taking mode) to the compression CPU 23 when it receives the half-depression signal, and sends to the compression CPU 23 a request signal requiring the number of continuously shootable frames L and the number of remaining frames N (reference numeral 101 in FIG. 8). The compression CPU 23 stores the received set mode data in the internal RAM (see FIG. 3).

The compression CPU 23 calculates the number of remaining frames N in accordance with the program for calculating the number of remaining frames in response to the above request signal. The compression CPU 23 first turns a switch SW2 of the power supply circuit 25 on (time $t_2$). Consequently, power is supplied to the CG 24, so that a clock signal is supplied to the Y/C processing circuit 14, the memory controller 18 and the compression/expansion circuit 21. Consequently, the circuits are made operable. The reset signal fed from the compression CPU 23 to the CG 24 is maintained at the L level. Accordingly no clock signal is fed to the CCD control circuit 48, the CCD 11, the signal processing circuit 12 and the A/D conversion circuit 13, even if power is supplied to the CG 24, as described earlier.

The compression CPU 23 finds the number of remaining frames N, as described above (reference numeral 102).

Subsequently, the compression CPU 23 finds the number of continuously shootable frames L in accordance with the program for calculating the number of continuously shootable frames, as described above (reference numeral 102).

The compression CPU 23 send to the display CPU 31 the found number of continuously shootable frames L and the found number of remaining frames N, and data indicating that the memory card 19 is loaded (loading detection data), if the memory card 19 is loaded (reference numeral 103).

The display CPU 31 stores in the internal RAM the number of continuously shootable frames L, the number of remaining frames N and the loading detection data (see FIG. 5). The number of remaining frames N and the number of continuously shootable frames L are displayed on a display device 33 (a liquid crystal display device or the like) (reference numeral 104 represents the time point where display is started). The number of remaining frames N is indicated by a numeral N. When the number of remaining frames N is zero, a numeral 0 is displayed. Similarly, the number of continuously shootable frames L is indicated by a numeral L. When the number of continuously shootable frames L is zero, a numeral 0 is displayed.

Thereafter, the compression CPU 23 selects the program for the single picture-taking mode on the basis of the set mode data stored in the internal RAM, to perform processing in the single picture-taking mode in accordance with this program.

In a case where the memory card 19 is not loaded, the memory controller 18 feeds to the compression CPU 23 data indicating that the memory card 19 is not loaded (unloading detection data). The compression CPU 23 feeds, when it receives the unloading detection data from the memory controller 18, the data to the display CPU 31 (reference numeral 103). The display CPU 31 stores this data in the internal RAM. The display CPU 31 causes the display device 33 to display the fact that the memory card 19 is not loaded. At this time, the number of remaining frames is not displayed.

The display device 33 is mounted on the surface of the body of the electronic still camera. The user can see the number of remaining frames N or the fact that the memory card is not loaded which is displayed on the display device 33 from outside the electronic still camera. When the number of remaining frames N is displayed, the user can know the number of frames which can be taken by seeing the displayed number of remaining frames. If the fact that the memory card 19 is not loaded is displayed, the user will load the memory card as required by knowing that no memory card is loaded.

When the foregoing processings are terminated, the compression CPU 213 turns the power supply switch SW2 off, to stop the supply of the clock signal to the memory controller 18 and the like (time $t_3$).

Furthermore, the display CPU 31 issues to the main CPU 37 a command to start automatic focusing (AF) processing and automatic exposure (AE) processing. The main CPU 31 issues, in response to this command to start AF and AE, a command to start photometry to an AE-CPU 38 and a command to start distance measurement and focusing to an AF-CPU 41 in accordance with the processing program stored in the internal ROM. Consequently, the AE processing and the AF processing are performed (reference numerals 105 and 106).

An AE sensor 39 (a photodiode or the like) detects the brightness of a subject to be photographed. A signal representing the detected brightness (a brightness signal) is fed to the AE-CPU 38. The AE-CPU 38 accepts the brightness signal when it receives the command to start photometry, to find a photometric value on the basis of the brightness signal. The photometric value is sent to the main CPU 37.

Furthermore, the AE-CPU 38 judges whether the amount of exposure is too small (the subject is too dark) or the amount of exposure is too large (the subject is too bright) on the basis of the brightness signal. If the amount of exposure is too small, the AE-CPU 38 displays an underexposure warning on a display device 40 (a liquid crystal display device or the like) provided in a finder. If the amount of exposure is too large, the AE-CPU 38 displays an overexposure warning on the display device 40. The user can know whether the amount of exposure is too small or too large by seeing the warning.

The calculation of the photometric value and the display of the overexposure or underexposure warning are achieved in accordance with a program stored in an internal ROM of the AE-CPU 38.

The main CPU 37 finds an f-stop value and a shutter speed (the time period during the focal-plane shutter 29 is being opened) on the basis of the given photometric value. The f-stop value is applied to a diaphragm control device 45. The diaphragm control device 45 controls a diaphragm 30 on the basis of the given f-stop value. Data representing the shutter speed (shutter speed data) is stored in the internal RAM of the main CPU 37. The shutter speed data is used for measuring time elapsed from the time when the focal-plane shutter 29 is opened until it is closed.

Furthermore, the shutter speed data is sent to the display CPU 31 from the main CPU 37. The display CPU 31 stores this shutter speed data in the internal RAM (see FIG. 5).

A lens CPU 42 finds the zoom position of an imaging lens in accordance with a processing program stored in its internal ROM. Data representing the zoom position is fed to the AF-CPU 41. An AF sensor 44 senses the distance from the camera to the subject to be photographed. Data representing the distance is fed to the AF-CPU 41.

The AF-CPU 41 finds a measured distance value when it receives the command to start distance measurement and focusing. The data representing the zoom position of the lens given from the leans CPU 42 and the data representing the distance given from the AF sensor 44 are used for calculating the measured distance value. The AF-CPU 41 drives an AF motor 43 to adjust the position of the lens on the basis of the measured distance value for focusing. When the foregoing processings are terminated, the AF-CPU 41 gives notice that processing is terminated to the main CPU 37. The processing of the AF-CPU 41 is performed in accordance with a program stored in its internal ROM.

When AF control and AE control are completed, the main CPU 37 gives notice that AF control and AE control are completed to the display CPU 31. In addition, the main CPU 37 instructs the AE-CPU 38 to display release permission on the display device 40. The AE-CPU 38 displays the release permission on the display device 40 in accordance with this instruction. Consequently, the user can know that the shutter can be released.

The display CPU 31 enters the input wait state of a shutter release signal (a full-depression signal) from the shutter release button 35 when it receives the notice that AF control and AE control have been completed from the main CPU 37. The display CPU 31 changes the release signal sent to the compression CPU 23 to the H level when it receives the full-depression signal from the shutter release button 35 (time $t_4$). In a case where the full-depression signal from the shutter release button 35 has been already applied to the display CPU 31 during the above described AF control and AE control, the display CPU 31 immediately changes the release signal into the H level.

When the release signal given to the compression CPU 23 attains the H level, the compression CPU 23 turns the power supply switch SW2 on again (time $t_4$). In addition, the compression CPU 23 starts the internal timer, to measure the data set time $\alpha$ (time $t_4$).

The display CPU 31 generates WB data on the basis of a color signal from the color sensor 34 during the data set time $\alpha$. In addition, the display CPU 31 reads out the present date from the RTC 32. The display CPU 31 gives to the compression CPU 23 the WB data, the date data, and the shutter speed data found at the time of the AE control (reference numeral 107). The compression CPU 23 stores the WB data and the date data in the internal RAM (see FIG. 3). Further, the compression CPU 23 finds the imaging-allowed time $\gamma$ on the basis of the shutter speed data and stores the same in the internal RAM (See FIG. 3).

Furthermore, the compression CPU 23 reads out the gain data of the gamma correction circuit included in the signal processing circuit 12, the gain data of the reproduction circuit 16, and the data representing a reference voltage of the A/D conversion circuit 13 from the EEPROM 27 during this data set time a (see FIG. 6). These data are converted into the analog signal by the D/A conversion circuit 15 (electronic volume) and then, are respectively set in the signal processing circuit 12, the reproduction circuit 16 and the A/D conversion circuit 13 (reference numeral 108). In addition, the WB data fed to the compression CPU 23 from the display CPU 31 is converted into analog signal by the D/A conversion circuit 15 (electronic volume) and then, is set in the white balance adjustment circuit included in the signal processing circuit 12 (reference numeral 108).

Time sufficient for the display CPU 31 and the compression CPU 23 to perform the foregoing processings is set as the data set time $\alpha$.

When the timer terminates the measurement of the data set time $\alpha$, the compression CPU 23 changes the reset signal applied to the CG 24 into the H level (time $t_5$). When the reset signal attains the H level, the CG 24 supplies the horizontal transfer signal, the vertical transfer signal and the VD signal to the CCD control circuit 48. The horizontal and vertical transfer signals are fed to the CCD 11 from the CCD control circuit 48 under the control of the CCD control circuit 48. Further the CG 24 supplies the clamp pulse signal, the sampling clock signal, and the VD signal (vertical blanking signal) to the signal processing circuit 12, the A/D conversion circuit 13, and the compression CPU 23, respectively. The CG 24 supplies the clock signal continuously (including a time period during which the reset signal is at the L level) to the Y/C processing circuit 14, the memory controller 18 and the compression/expansion circuit 21.

The compression CPU 23 measures time by counting the VD signal supplied from the CG 24 after an elapse of the data set time $\alpha$. The compression CPU 23 sets in the CCD control circuit 48 the imaging-allowed time $\gamma$ stored in the internal RAM (see FIG. 3) when a time of 2 VD elapses after an elapse of the data set time $\alpha$ (reference numeral 109).

The CCD control circuit 48 gives to the CCD 11 accumulated-and-unnecessary charge sweep (clear) signal as a control signal when a time of 3 VD elapses after an elapse of the data set time $\alpha$. The CCD 11 sweeps charges in response to this signal. The sweeping processing is performed so as to bring the CCD 11 into the reset state before exposure.

The CCD 11 enters a state where image charges can be accumulated when the exposure preparation time $\beta$ (=4 VD) elapses after an elapse of the data set time $\alpha$ (time $t_6$). This state is maintained during the imaging-allowed time $\gamma$ (time which is integral multiple of VD). The imaging-allowed time $\gamma$ is measured by the CCD control circuit 48 on the basis of the imaging-allowed time $\gamma$ set in the CCD control circuit 48 by the compression CPU 23.

Furthermore, the compression CPU 23 brings the shutter signal into the H level in order to instruct to open the shutter 29 when the exposure preparation time $\beta$ elapses after an elapse of the data set time $\alpha$ (time $t_6$). When the shutter signal attains the H level, the display CPU 31 issues a shutter open command to the main CPU 37. The main CPU 37 feeds a shutter open signal to the shutter control device 46 when it receives the shutter open command from the display CPU 31. Consequently, the shutter control device 46 opens the focal-plane shutter 29. A subject image is formed on the light-receiving surface of the CCD 11 through an imaging lens 28 by opening the shutter 29.

The delay time from the time point when the compression CPU 23 brings the shutter signal into the H level to the time point when the shutter 29 is actually opened is several micro ($\mu$) seconds at longest, so that the delay time may be ignored.

Accordingly, the focal-plane shutter 29 is always opened when a constant time ($\alpha+\beta$) elapses after the shutter release by the shutter release button 34. Since the shutter 29 is opened always after an elapse of the constant time from the shutter release and imaging is executed, a cameraman or an user can photograph without missing the shutter chance by grasping the constant time ($\alpha+\beta$).

The main CPU 37 starts to measure the time (shutter open time) when the focal-plane shutter 29 is opened on the basis of the shutter speed data stored in the internal RAM. The main CPU 37 feeds a shutter close signal to the shutter control device 46 after the shutter open time has elapsed since the shutter 29 was opened. Consequently, the shutter control device 46 closes the shutter 29. As described above, time longer than the shutter open time is set as the imaging-allowed time $\gamma$. Consequently, the focal-plane shutter 29 is opened and closed within the time period of this imaging-allowed time $\gamma$.

The CCD control circuit 48 applies a charge transfer signal as a control signal to the CCD 11 after an elapse of the imaging-allowed time $\gamma$ (time which is integral multiple of VD) (time $t_7$). Consequently, an analog electric signal (video signal) representing the subject image is read out of the CCD 11, and fed to the signal processing circuit 12. When the CCD 11 has 1280×1014 pixels (approximately 1,300,000 pixels), it takes a time of 8 VD to read out the analog electric signals representing all the pixels.

The signal processing circuit 12 comprises the white balance adjustment circuit and the gamma correction circuit. The video signal fed to the signal processing circuit 12 from the CCD 11 is subjected to white balance adjustment and gamma correction by the circuits (reference numeral 111). Particularly, the level range of the video signal is narrowed by the gamma correction, thereby to make it possible to use an A/D conversion circuit 13 of a small number of bits.

The analog video signal outputed from the signal processing circuit 12 is applied to the A/D conversion circuit 13. In the A/D conversion circuit 13, the analog video signal is converted into digital image data (reference numeral 111). The digital image data is applied to the Y/C processing circuit 14. The Y/C processing circuit 14 generates luminance image data Y and chrominance image data (dot sequential data of color difference data R–Y and B–Y) C from the digital image data applied from the A/D conversion circuit 13 under the control of the compression CPU 23.

The compression CPU 23 instructs the memory controller 18 to accept image data. Consequently, the luminance image data Y and the chrominance image data C generated are accepted in the memory controller 18, and are stored in the frame memory 17 (the DRAM, the SRAM and the like) (reference numeral 111).

The compression CPU 23 updates the directory and the FAT in the memory card 19 so as to store the image data obtained by the imaging while the video signal from the CCD 11 is processed (reference numeral 110). The compression CPU 23 brings the shutter signal into the L level when the above processing is terminated (time $t_8$).

When the shutter signal attains the L level, the display CPU 31 applies a rolling signal of the shutter 29 (a shutter charge signal) to the shutter control device 46 through the main CPU 37. The shutter control device 46 rolls or winds the shutter 29 up in response to this signal, to prepare for the subsequent imaging. When the rolling of the shutter is completed, the shutter control device 46 sends to the main CPU 37 a rolling completion signal. The main CPU 37 feeds the rolling completion signal to the display CPU 31 when it receives the signal from the shutter control device 46.

Furthermore, the display CPU 31 sends a compression command to the compression CPU 23 when it receives the rolling completion signal from the main CPU 31 (reference numeral 112).

The compression CPU 23 feeds to the memory controller 18 a read command of the image data stored in the frame memory 17 when it receives the compression command. Consequently, the luminance image data Y and the chrominance image data C which are stored in the frame memory 17 are read out by the memory controller 18, and are fed to the compression/expansion circuit 21. In addition, the compression CPU 23 applies to the compression/expansion circuit 21 the compression command and data representing the number of bytes S used in the length-fixing processing.

The compression/expansion circuit 21 divides each of the image data Y and C into a plurality of blocks, and subjects the image data to ADCT conversion for each block (reference numeral 113). The data (block data) subjected to the ADCT conversion are stored in the frame memory 17 again by the memory controller 18. Subsequently, the block data is applied again to the compression/expansion circuit 21 from the frame memory 17, and are subjected to Huffman coding for each block.

In the compression/expansion circuit 21, the block data subjected to Huffman coding (coded block data) is adjusted to data having a length corresponding to the number of bytes S given from the compression CPU 23 (length-fixing processing). If the number of bytes constituting the coded block data is less than the length S, the coded block data is adjusted to the length S by adding dummy data to the coded block data. If the length of the coded block data exceeds the length S, compression and coding processing is repeated again until the length becomes not more than the length S, and the dummy data is added to the coded block data as required (reference numeral 113).

The image data thus subjected to compression, coding and length-fixing processing is stored in the memory card 19 by the memory controller 18 (reference numeral 114). In addition, the compression CPU 23 feeds the date data stored in the internal RAM to the memory controller 18. The memory controller 18 stores the date data in correspondence with the image data (file) in the date data area of the memory card 19 (reference numeral 114).

The shutter 29 is rolled up after the Y/C processing of the image signal has been completed in the Y/C processing circuit 14, but before the compression processing for the image data Y and C is executed. Accordingly, no processing for the image data is performed during the shutter 29 is being rolled up. Consequently, such harmful influence in the data processing can be avoided that the Y/C processing circuit 14, the compression/expansion circuit 21 and the like do not operate normally due to the current required for the shutter rolling, errors occur in data due to noises, and so on.

Thereafter, postprocessing (processing such as releasing of a mechanism for preventing the memory card from being unloaded while data is being written to the memory card) is performed by the compression CPU 23 (reference numeral 114).

Furthermore, the compression CPU 23 turns the power supply switch SW2 off, and returns the reset signal to the CG 24 to the L level. In addition, the display CPU 31 turns the power supply switch SW1 off, to bring the release signal into the L level. Consequently, the electronic still camera enters the standby state for the subsequent imaging (time $t_9$).

When the number of remaining frames N stored in the internal RAM of the display CPU 31 (the number of remaining frames N displayed on the display device 33) is zero or the memory card 19 is not loaded, the display CPU 31 ignores, even if it receives the shutter release signal from the shutter release button 35, this signal. Specifically in this case, the display CPU 31 does not change the release signal to the H level even if the shutter is released by depressing the shutter release button 35. Consequently, the compression CPU 23 does not change the shutter signal to the H level. Even if the user releases the shutter, therefore, no imaging processing (processing such as opening or closing of the shutter and reading out of the video signal) is performed.

The reproduction circuit 16 converts the luminance image data Y and the chrominance image data C into an NTSC signal. The NTSC signal from the reproduction circuit 16 is sent to an external display device (a CRT display device or the like) or a recording device (a VTR or the like) connected to the electronic still camera. When the NTSC signal is sent to the display device, an image obtained by the imaging is reproduced on a display screen. If the NTSC signal is sent to the VTR, the NTSC signal is recorded on a magnetic tape or the like. Image data before compression which is stored in the frame memory 17 may be applied to the reproduction circuit 16. The compressed image data which is stored in the memory card 19 may be also applied to the reproduction circuit 16 after expansion by the compression/expansion circuit 21. Furthermore, the image data outputted from the Y/C processing circuit 14 may be also inputted to the reproduction circuit 16. The cases will be switched by a reproduction mode setting switch (not shown).

[Operation of electronic still camera in continuous picture-taking mode]

Figure 9:
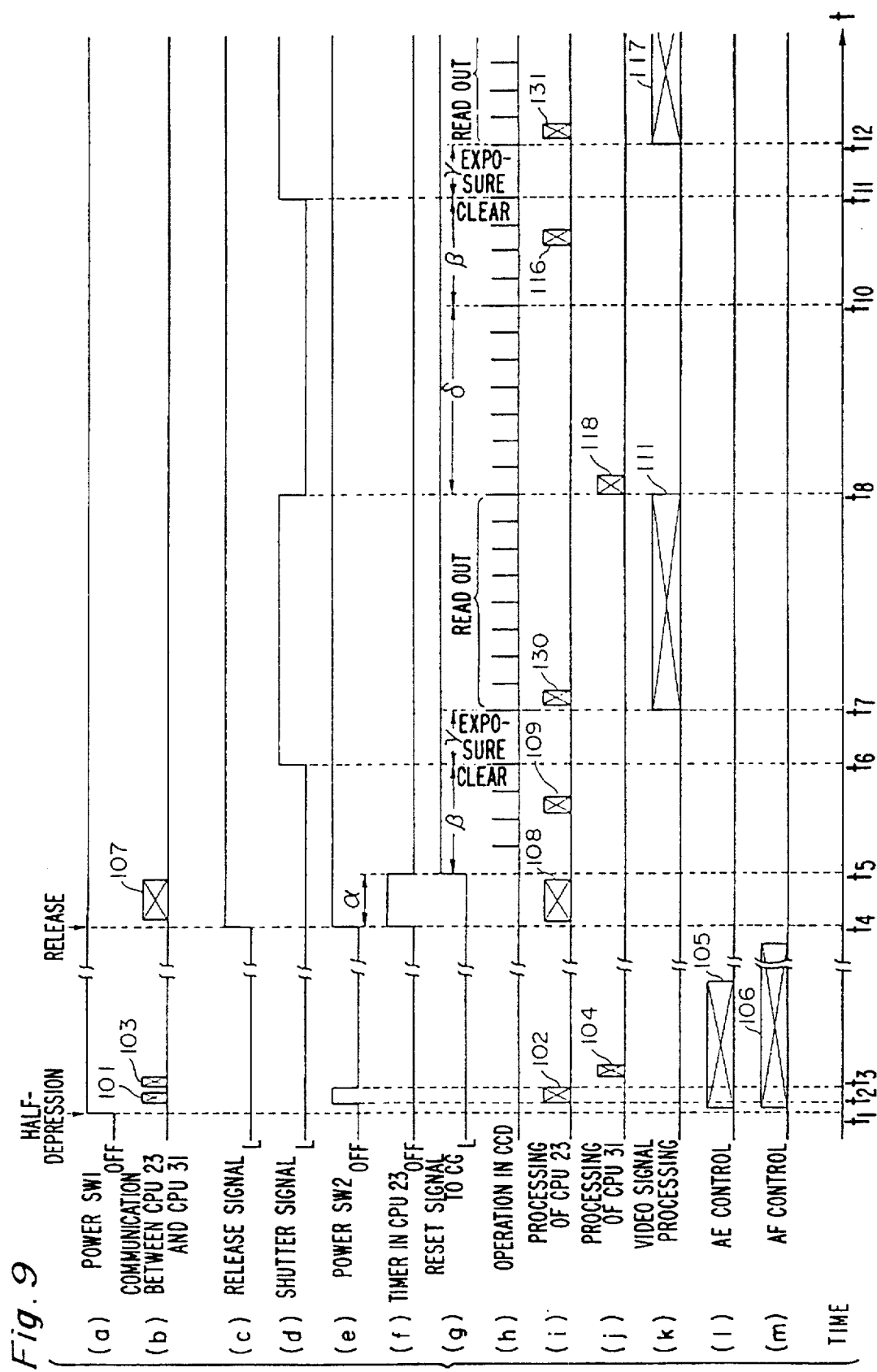
FIGS. 9 to 11 are timing charts showing processings performed by the electronic still camera in the continuous picture-taking mode.
Figure 10:
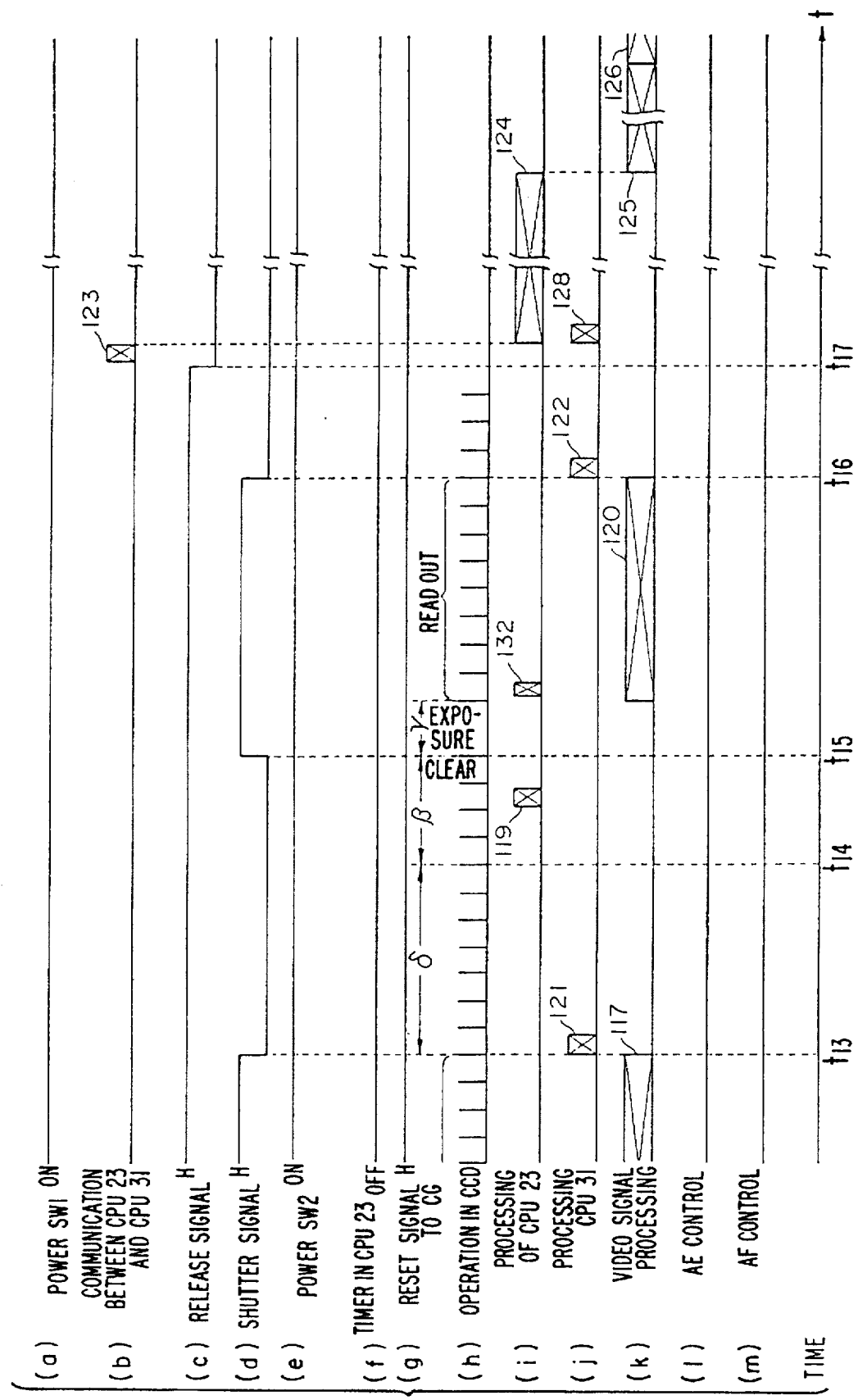
Figure 11:
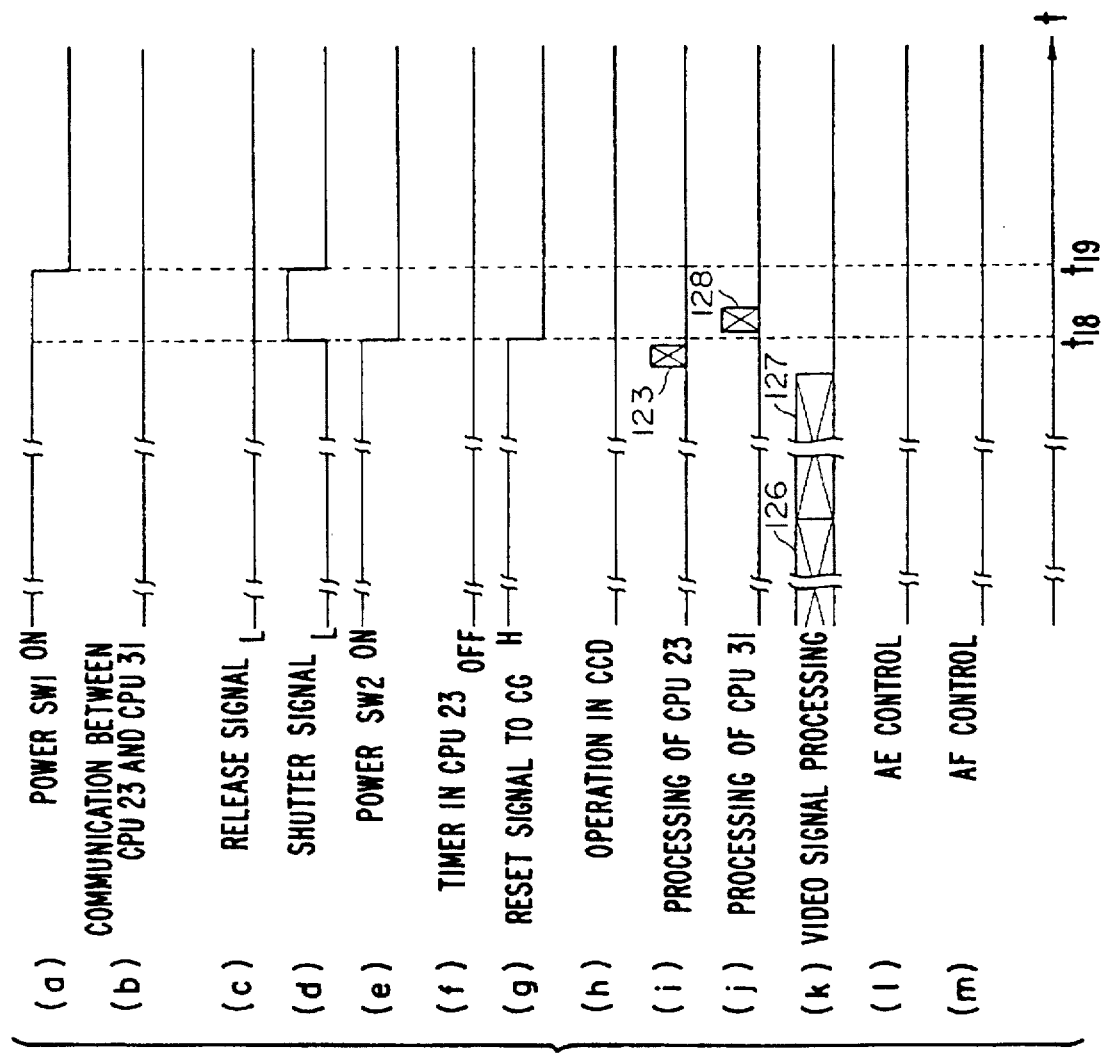
Figure 12A:
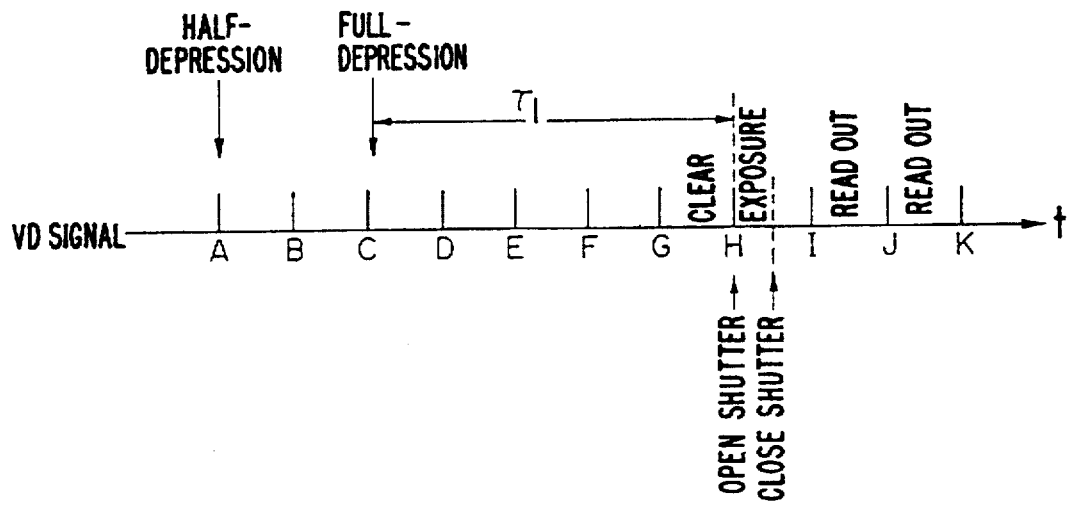
FIGS. 12a and 12b are timing charts showing processings performed by the conventional electronic still camera.
Figure 12B:
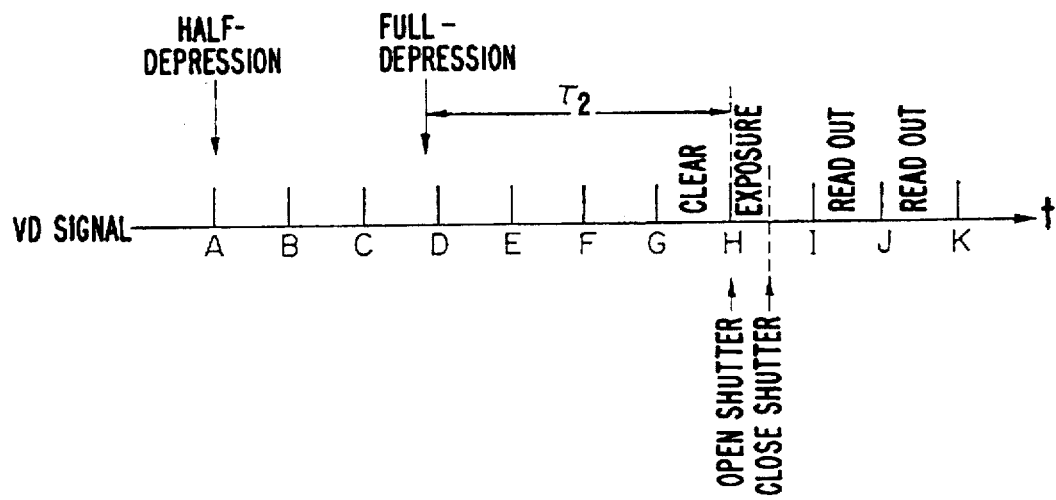

When the continuous picture-taking mode is selected by the continuous picture-taking/single picture-taking selecting switch 36, processing in the continuous picture-taking mode shown in timing charts of FIGS. 9 to 11 is performed. Processing in a case where three frames are continuously taken is shown. FIG. 9 is followed by FIG. 10. FIG. 10 is followed by FIG. 11. The same reference numeral is assigned to the same processing as that shown in FIG. 8.

The compression CPU 23 and the display CPU 31 select the program for the continuous picture-taking mode (FIGS. 2 and 4) previously stored in the respective inner ROMs on the basis of the set mode data, to perform the processing in the continuous picture-taking mode.

Processing in the time $t_1$, to the time $t_4$ is the same as the above described processing in the single picture-taking mode and hence, the description thereof is not repeated.

While the user releases the shutter by depressing the shutter release button 35 (full-depression of the button 35), the display CPU 31 maintains the release signal at the H level.

From the time $t_5$ to the time $t_8$, imaging for the first frame is performed, and image data obtained by the imaging is processed and is stored in the frame memory 17. This processing differs from the processing shown in FIG. 8 in that the compression CPU 23 does not update the directory and the FAT in the memory card 19 during the processing of the image data (there is no processing represented by reference numeral 110). The compression CPU 23 writes 1 in an area storing the number of frames continuously taken in the internal RAM during the processing of the image data (reference numeral 130) (see FIG. 3).

When the storing of the image data to the frame memory 17 is terminated, the compression CPU 23 brings the shutter signal into the L level (time $t_8$).

The display CPU 31 respectively decrements the number of continuously shootable frames L and the number of remaining frames N which are stored in the internal RAM by one when the shutter signal attains the L level. In addition, the display CPU 31 respectively decrements the number of continuously shootable frames L and the number of remaining frames N which are displayed on the display device 33 by one (reference numeral 118).

The compression CPU 23 returns the shutter signal to the L level and then, measures time corresponding to the interval time δ previously stored in the internal ROM. The compression CPU 23 counts the VD signal fed from the CG 24, to measure the time δ.

When a time of 2 VD further elapses after an elapse of the interval δ, the compression CPU 23 sets the imaging-allowed time γ in the CCD control circuit 48 (reference numeral 116). This processing is the same as the processing represented by reference numeral 109 in FIG. 8. As the imaging-allowed time to be set, the same time as that at the time of the imaging for the first frame (the time stored in the internal RAM of the compression CPU 23) is used without any modification. Specifically, AE processing and AF processing are performed prior to the imaging for the first frame in the continuous picture-taking mode. After this time on, no AE processing and AF processing are performed.

When the exposure preparation time β further elapses after an elapse of the interval time δ, the compression CPU 23 brings the shutter signal into the H level (time $t_{11}$). Consequently, imaging for the second frame is performed. Exposure processing, processing of reading out the video signal from the CCD 11, and processing performed by the signal processing circuit 12, the A/D conversion circuit 13 and the Y/C processing circuit 14 (reference numeral 117) are the same as the processing for the first frame represented by the reference numeral 111.

The compression CPU 23 increments the number of frames continuously taken which is stored in the internal RAM by one to two (reference numeral 131).

The display CPU 31 respectively decrements the number of remaining frames N and the number of continuously shootable frames L which are stored in the internal RAM by one (reference numeral 121). In addition, the display CPU 31 respectively decrements the numbers displayed on the display device 33 by one.

Image data outputted from the Y/C processing circuit 14 is transferred to the buffer memory $55_1$ in the add-on memory board M1 through the buffer memory 20 and the connector C1. The compression CPU 23 issues a command to accept image data to the memory controller $53_1$ in the memory board M1 through the selector 22. The memory controller $53_1$ stores the image data transferred to the buffer memory $55_1$ in the frame memory $51_1$ in response to this command (reference numeral 117).

Thereafter, time corresponding to the interval time δ is measured, to prepare for imaging for the third frame (reference numeral 119 in FIG. 10 and sweeping of charges of the CCD 11). Thereafter, the imaging for the third frame is performed (time $t_{15}$). The compression CPU 23 issues a command to accept image data to the memory controller $54_1$ in the memory board M1. The memory controller $54_1$ stores the image data of the third frame transferred to the buffer memory $55_1$ in the frame memory $52_1$ in response to this command (reference numeral 120).

The compression CPU 23 increments the number of frames continuously taken which is stored in the internal RAM by one to three (reference numeral 132).

The number of remaining frames N and the number of continuously shootable frames L which are stored in the internal RAM of the display CPU 31 are respectively decremented by one (reference numeral 122). The numbers displayed on the display device 33 are respectively decremented by one.

Thereafter, when the user stops the release of the shutter by the depression of the shutter release button 35, the display CPU 31 returns the release signal to the L level (time $t_{17}$). Consequently, the compression CPU 23 knows that continuous picture-taking is stopped. After this time on, the compression CPU 23 inhibits the shutter signal from being brought into the H level. Consequently, imaging for the fourth frame and the subsequent frames is not performed.

After bringing the release signal into the L level, the display CPU 31 sends a rolling signal of the shutter 29 (a shutter charge signal) to the shutter control device 46 through the main CPU 37. In a case where the shutter signal remains at the H level (storing of the image data into the frame memory is not completed yet) when the release signal attains the L level, the display CPU 31 waits until the shutter signal is changed to the L level, and thereafter sends the rolling signal to the shutter control device 46 through the main CPU 37.

The shutter control device 46 rolls the shutter 29 up in response to the rolling signal, to prepare for the subsequent imaging. When the rolling of the shutter is completed, the shutter control device 46 sends to the main CPU 37 a rolling completion signal. The main CPU 37 feeds the rolling completion signal to the display CPU 31 when it receives the signal from the shutter control device 46.

The display CPU 31 issues a compression command to the compression CPU 23 (reference numeral 123), when it receives the rolling completion signal from the main CPU 31.

In this way, no processing for the image data is performed during the shutter is being rolled up even in the continuous picture-taking mode. Therefore such arrangement prevent the current required for the shutter rolling, noises arising at the shutter rolling and the like from affecting data processing.

The compression CPU 23 updates the directory and the FAT in the memory card 19 (reference numeral 124) so as to store image files of the number of frames continuously taken (three frames in this case) which is stored in the internal RAM in response to the compression command.

Subsequently, the compression CPU 23 subjects the image data stored in the frame memories to compression processing on the basis of the number of frames continuously taken. In this case, the number of frames continuously taken is 3, so that the image data stored in the frame memories 17, $51_1$ and $52_1$ become processing objects.

First, the image data stored in the frame memory 17 is applied to the compression/expansion circuit 21. The image data applied to the compression/expansion circuit 21 is subjected to compression, Huffman coding and length-fixing processing. The compressed image data is stored in the memory card 19 (reference numeral 125 in FIG. 10). In addition, the date data stored in the internal RAM of the compression CPU 23 is stored in correspondence with the compressed image data (file) in the date data area of the memory card 19 (reference numeral 125).

The image data stored in the frame memory $51_1$ in the memory board M1 is then subjected to data compression, Huffman coding and length-fixing processing in the compression/expansion circuit 21, and is stored in the memory card 19 (reference numeral 126 from FIG. 10 to FIG. 11). The date data is also stored in the memory card 19 (reference numeral 126). Subsequently, the image data stored in the frame memory $52_1$ in the memory board M1 is subjected to compression, Huffman coding and length-fixing processing in the compression/expansion circuit 21, and is stored in the memory card 19 (reference numeral 127 in FIG. 11). The date data is also stored in the memory card 19 (reference numeral 127).

Thereafter, postprocessing (processing such as releasing of a mechanism for preventing the memory card from being unloaded while data is being written to the memory card) is performed (reference numeral 123). After the postprocessing is terminated, the compression CPU 23 returns the reset signal to the CG 24 into the L level. In addition, the compression CPU 23 turns the switch SW2 off, to stop the supply of power to the CG 24. Further, the compression CPU 23 brings the shutter signal into the H level, to notify the display CPU 31 that recording of the image data in the memory card 19 is completed (time $t_{18}$).

The display CPU 31 turns the switch SW1 off when it receives notice that recording of the image data in he memory card 19 is completed, to stop the supply of power to the compression CPU 23 (time $T_{19}$). Consequently, the electronic still camera enters the standby state for the subsequent imaging.

Also in the continuous picture-taking mode, when the number of remaining frames N becomes one, a numeral 1 is displayed on the display device 33. When the remaining frames N becomes zero, a numeral 0 is displayed on the display device 33. Further, when the number of continuously shootable frames L becomes one, a numeral 1 is displayed on the display device 33. When the number of continuously shootable frames L becomes zero, a numeral 0 is displayed on the display device 33.

When in the continuous picture-taking mode, at least either one of the number of remaining frames N and the number of continuously shootable frames L becomes zero during the imaging, the display CPU 31 ignores, even if it is receiving the shutter release signal from the shutter release button 35, this signal. Even if the shutter is released by depressing the shutter release button 35, therefore, the electronic still camera performs no imaging operation. The display CPU 31 changes the release signal applied to the compression CPU 23 to the L level, and sends the compression command to the compression CPU 23. Image data for one or a plurality of frames obtained by imagine performed until the imaging operation is stopped are read out from the frame memories, and are subjected to compression, Huffman coding and length-fixing processing. The image data processed is stored in the memory card 19. Thereafter, the postprocessing is performed, so that the electronic still camera enters the standby state.

If in the continuous picture-taking, frame memories in all memory boards mounted become full, the number of continuously shootable frames L becomes zero. The continuous picture-taking operation is stopped as described above, so that the image data stored in the frame memories are subjected to compression processing, and are stored in the memory card. Even when the image data for one or a plurality of frame memories in the memory boards are read out, resulting in a state where image data can be stored in the frame memories, no imaging operation is performed even if the shutter release button 35 is full-depressed in the continuous picture-taking mode. That is, the subsequent imaging cannot be performed until the image data stored in all the frame memories are compressed and are stored in the memory card.

In a case where the memory card 19 is not loaded, the display CPU 31 also ignores the shutter release signal from the shutter release button 35, as described in the processing in the single picture-taking mode.

The shutter speed data may be found by performing AE processing every time imaging for each frame in the continuous picture-taking mode is performed. It is also possible to find the imaging-allowed time γ on the basis of the shutter speed data and set the time γ in the CCD control device 48 every time imaging for each frame is performed.

As many apparently widely different embodiments of the present invention can be made without departing from the spirit and scope thereof, it is to be understood that the invention is not limited to the specific embodiments thereof except as defined in the appended claims.

What is claimed is:

1. An electronic still camera in which a mechanical shutter is opened in synchronizing with a synchronizing signal generated by a synchronizing signal generating circuit and a solid state electronic imaging device is exposed while said mechanical shutter is being opened, comprising:

starting means for causing said synchronizing signal generating circuit to start the generation of the synchronizing signal in response to a shutter release by a shutter release button;

shutter control means for causing said mechanical shutter to open in synchronizing with a synchronizing signal which is generated after a first predetermined constant time period elapses from the start of the operation of said synchronizing signal generating circuit, and for causing said mechanical shutter to close after time necessary for exposure elapses from the opening of said mechanical shutter;

signal processing means for processing a video signal outputted from said solid state electronic imaging device which is exposed during the time from the opening of said mechanical shutter to the closing of said mechanical shutter, the video signal representing an imaged subject; and control means for causing a shutter winding device to roll up said mechanical shutter after the processing in said signal processing means has been completed.

2. The electronic still camera according to claim 1, wherein said starting means causes said synchronizing signal generating circuit to start the operation after a second predetermined constant time period elapses from the shutter release.

3. The electronic still camera according to claim 2, wherein the second predetermined constant time period precedes the first predetermined constant time period.

4. An electronic still camera imaging a subject by opening and closing a mechanical shutter to expose a solid state electronic imaging device, comprising:

shutter control means for causing said mechanical shutter to open in response to a shutter release by a shutter release button and to close after time necessary for exposure elapses from the opening of said mechanical shutter;

signal processing means for converting a video signal representing an imaged subject and outputted from said solid state electronic imaging device which is exposed during the time from the opening of said mechanical shutter to the closing of said mechanical shutter to digital image data; and control means for causing a shutter winding device to roll up said mechanical shutter after the processing in said signal processing means has been completed.

5. The electronic still camera according to claim 4 further comprising:

data compressing means for compressing the digital image data outputted from said signal processing means; and said control means for causing said data compressing means to compress the digital image data after the rolling up of the shutter by said shutter winding device has been completed.

6. In an electronic still camera in which a mechanical shutter is opened in synchronizing with a synchronizing signal generated by a synchronizing signal generating circuit and a solid state electronic imaging device is exposed while the mechanical shutter is being opened, a method of controlling the operation of said electronic still camera comprising the steps of:

causing said synchronizing signal generating circuit to start the generation of the synchronizing signal in response to a shutter release by a shutter release button;

causing said mechanical shutter to open in synchronizing with a synchronizing signal which is generated after a first predetermined constant time period elapses from the start of the operation of said synchronizing signal generating circuit;

causing said mechanical shutter to close after time necessary to exposure elapses from the opening of said mechanical shutter; and processing a video signal representing an imaged subject and outputted from said solid state electronic imaging device which is exposed during the time from the opening of said mechanical shutter to the closing of said mechanical shutter, wherein the synchronizing signal is a synchronizing signal used to synchronize the solid state electronic imaging device.

7. The method of controlling the operation of said electronic still camera according to claim 6, further comprising a step of causing said synchronizing signal generating circuit to start the operation after a second predetermined constant time period elapses from the shutter release.

8. The method of controlling the operation of an electronic still camera according to claim 7, wherein the second predetermined constant time period precedes the first predetermined constant time period.

9. In an electronic still camera for imaging a subject by opening and closing a mechanical shutter to expose a solid state electronic imaging device, a method of controlling the operation of said electronic still camera comprising the steps of:

causing said mechanical shutter to open in response to a shutter release by a shutter release button;

causing said mechanical shutter to close after time necessary for exposure elapses from the opening of said mechanical shutter;

converting a video signal representing an imaged subject and outputted from said solid state electronic imaging device which is exposed during the time from the opening of said mechanical shutter to the closing of said mechanical shutter to digital image data; and rolling up said mechanical shutter after the conversion processing to the digital image data has been completed.

10. The method of controlling the operation of said electronic still camera according to claim 9 further comprising a step of compressing the digital image data after the rolling up of said mechanical shutter has been completed.

11. An electronic still camera in which a mechanical shutter is opened in synchronous with a synchronizing signal generated by a synchronizing signal generating circuit and a solid state electronic imaging device is exposed while said mechanical shutter is being opened, comprising:

starting device for causing said synchronizing signal generating circuit to start the generation of the synchronizing signal in response to a shutter release by a shutter release button;

shutter control device for causing said mechanical shutter to open in synchronous with a synchronizing signal which is generated after a first predetermined constant time period elapses from the start of the operation of said synchronizing signal generating circuit, and for causing said mechanical shutter to close after time necessary for exposure elapses from the opening of said mechanical shutter; and signal processing circuit for processing a video signal representing an imaged subject and outputted from said solid state electronic imaging device which is exposed during the time from the opening of said mechanical shutter to the closing of said mechanical shutter, wherein the synchronizing signal generated by the synchronizing signal generating circuit is a synchronizing reference signal useable by said solid state electronic imaging device.

12. The electronic still camera according to claim 11, wherein the synchronizing signal includes a vertical synchronizing signal used by said solid state electronic imaging device.

13. An electronic still camera imaging a subject by opening and closing a mechanical shutter to expose a solid state electronic imaging device, comprising:

shutter control device for causing said mechanical shutter to open in response to a shutter release by a shutter release button and to close after time necessary for exposure elapses from the opening of said mechanical shutter;

signal processing circuit for converting a video signal representing an imaged subject and outputted from said solid state electronic imaging device which is exposed during the time from the opening of said mechanical shutter to the closing of said mechanical shutter to digital image data; and control device for causing a shutter winding device to roll up said mechanical shutter after the processing in said signal processing circuit has been completed.

14. An electronic still camera in which a mechanical shutter is opened in synchronizing with a synchronizing signal generated by a synchronizing signal generating circuit and a solid state electronic imaging device is exposed while said mechanical shutter is being opened, comprising:

starting means for causing said synchronizing signal generating circuit to start the generation of the synchronizing signal in response to a shutter release by a shutter release button;

shutter control means for causing said mechanical shutter to open in synchronizing with a synchronizing signal which is generated after a first predetermined constant time period elapses from the start of the operation of said synchronizing signal generating circuit, and for causing said mechanical shutter to close after time necessary for exposure elapses from the opening of said mechanical shutter;

signal processing means for processing a video signal outputted from said solid state electronic imaging device which is exposed during the time from the opening of said mechanical shutter to the closing of said mechanical shutter, the video signal representing an imaged subject, wherein the synchronizing signal generated by the synchronizing signal generating circuit is a synchronizing reference signal useable by said solid state electronic imaging device.

15. The electronic still camera according to claim 14, wherein the synchronizing signal includes a vertical synchronizing signal used by said solid state electronic imaging device.

16. An electronic still camera in which a mechanical shutter is opened in synchronizing with a synchronizing signal generated by a synchronizing signal generating circuit and a solid state electronic imaging device is exposed while said mechanical shutter is being opened, comprising:

starting means for causing said synchronizing signal generating circuit to start the generation of the synchronizing signal in response to a shutter release by a shutter release button;

shutter control means for causing said mechanical shutter to open in synchronizing with a synchronizing signal which is generated after a first predetermined constant time period elapses from the start of the operation of said synchronizing signal generating circuit, and for causing said mechanical shutter to close after time necessary for exposure elapses from the opening of said mechanical shutter;

signal processing means for processing a video signal outputted from said solid state electronic imaging device which is exposed during the time from the opening of said mechanical shutter to the closing of said mechanical shutter, the video signal representing an imaged subject, wherein said starting means causes said synchronizing signal generating circuit to start the operation after a second predetermined constant time period elapses from the shutter release, and wherein the second predetermined constant time period expires after data necessary for signal processing are set, which data are set after the shutter release.

* * * * *